(12) United States Patent
Zander et al.

(10) Patent No.: US 8,969,511 B2
(45) Date of Patent: Mar. 3, 2015

(54) POLYETHER BLOCK COPOLYMERS AND COMPOSITIONS THAT CAN BE OBTAINED THEREFROM

(75) Inventors: Lars Zander, Neuötting (DE); Uwe Franken, Dormagen (DE); Christiane Kunze, Cologne (DE); Michael Krebs, Hilden (DE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/560,149

(22) Filed: Jul. 27, 2012

(65) Prior Publication Data

US 2013/0085239 A1   Apr. 4, 2013

Related U.S. Application Data

(63) Continuation of application No. PCT/EP2011/051355, filed on Feb. 1, 2011.

(30) Foreign Application Priority Data

Feb. 2, 2010   (DE) .................... 10 2010 001 470

(51) Int. Cl.

| | | |
|---|---|---|
| *C08G 65/04* | (2006.01) | |
| *C08G 63/91* | (2006.01) | |
| *C08G 65/20* | (2006.01) | |
| *C08G 65/26* | (2006.01) | |
| *C09D 171/02* | (2006.01) | |
| *C09J 171/02* | (2006.01) | |

(52) U.S. Cl.
CPC .............. *C08G 63/916* (2013.01); *C08G 65/20* (2013.01); *C08G 65/2663* (2013.01); *C09D 171/02* (2013.01); *C09J 171/02* (2013.01); *C08G 2650/24* (2013.01)
USPC ........... 528/421; 525/403; 525/408; 525/409; 525/449

(58) Field of Classification Search
USPC ................... 525/403, 408, 409, 449; 528/421
See application file for complete search history.

(56) References Cited

U.S. PATENT DOCUMENTS

| | | | | |
|---|---|---|---|---|
| 4,029,720 A | * | 6/1977 | Seiler et al. .................... 525/89 |
| 4,477,589 A | | 10/1984 | Van der Hulst et al. |
| 6,753,402 B1 | | 6/2004 | Bauer et al. |
| 6,825,268 B2 | * | 11/2004 | Maier et al. .................. 524/840 |
| 7,053,152 B2 | | 5/2006 | Krebs et al. |
| 2005/0165163 A1 | * | 7/2005 | Krebs et al. .................... 525/66 |
| 2006/0116503 A1 | * | 6/2006 | Lendlein et al. .............. 528/272 |
| 2011/0071254 A1 | | 3/2011 | Bachon et al. |

FOREIGN PATENT DOCUMENTS

| | | | |
|---|---|---|---|
| CN | 1341133 A | 3/2002 | |
| CN | 100999573 | * 7/2007 | ............ C08G 65/10 |
| DE | 257834 | 6/1988 | |
| DE | 199 49 091 | 4/2001 | |
| DE | 103 61 277 | 7/2005 | |
| DE | 102008020980 | 10/2009 | |
| EP | 0205846 | 10/1991 | |
| EP | 0455400 | 11/1991 | |
| EP | 0520426 | 4/1996 | |
| JP | 2004346274 | * 12/2004 | ............ C08G 69/40 |
| RO | 111776 | 1/1997 | |
| WO | 9115530 | 10/1991 | |
| WO | 9213017 | 8/1992 | |
| WO | 9500830 | 1/1995 | |
| WO | 9928363 | 6/1999 | |
| WO | 0146330 | 6/2001 | |
| WO | 2004013199 | 2/2004 | |

OTHER PUBLICATIONS

Rangelov, S., et al.; Journal of Materials Science Letters, 1996, vol. 15, p. 271-274.*
BASF; Pluronic® RPE Types, Apr. 2005, p. 1-8.*
D'hollander, S., et al.; Polymer, 2009, p. 4447-4454.*
International Search Report issued in connection with International Patent Application No. PCT/EP2011/051355 mailed on Aug. 11, 2011.
Koberstein et al.: "Compression-Molded Polyurethane Block Copolymers. 1. Microdomain Morphology and Thermomechanical Properties", Macromolecules, Bd. 25, Nr. 23, 1, pp. 6195-6204, (1992), (XP000002652091).
Koberstein et al.: "Compression-Molded Polyurethane Block Copolymers. 2. Evaluation of Microphase Compositions", Macromolecules, Bd. 25, Nr. 23, 1, pp. 6205-6213, (1992), (XP000002652092).
Nagarajan et al.: "Preparation of acrylic block copolymer emulsion" Database Caplus [Online]; Chemical Abstracts Service Columbus, Ohio, US; 29. (2006); (XP000002652090).
Okano et al.: "Suppression of platelet activity on microdomain surfaces of 2-hydroxyethyl methacrylate-polyether block copolymers", Journal of Biomedical Materials Research, Bd. 20, Nr. 7, 1, pp. 1035-1047; (1986) (XP000002652089).
H. F. Huber and H. Müller in "Shaping Reactive Hotmelts Using LMW Copolyesters", Adhesives Age, (1987), Seite 32 bis 35.
DIN 53783, Mar. 1977.
ASTM D4671, Jul. 2010.
Cui et al.: "Producing polytetrahydrofuran blocked polyether diol", Database / Chemical Abstracts Service Columbus, Ohio US; (2007), (XP002636564).

* cited by examiner

*Primary Examiner* — Robert Jones, Jr.
(74) *Attorney, Agent, or Firm* — James E. Piotrowski

(57) ABSTRACT

Polyether block copolymers of the general structure B-(A-OH)$_n$ are described, where n is greater than or equal to 2 and blocks A are made up of polyoxypropylene units and the central block B of polyoxytetramethylene, polyoxyethylene, polybutadiene, polyisoprene, polyacrylate, polymethacrylate, polyamide, polyurethane, or polyester units. These polyether block copolymers are suitable for the manufacture of compositions that serve as the basis for preparations for use as a one-component moisture-hardening or two-component adhesive or sealant, for assembly bonding, for areal bonding, and/or for coating, as a reactive melt adhesive or as a laminating adhesive.

11 Claims, No Drawings

POLYETHER BLOCK COPOLYMERS AND COMPOSITIONS THAT CAN BE OBTAINED THEREFROM

The present invention relates to special polyether block copolymers, to compositions based on such polyether block copolymers, to preparations that contain the polyether block copolymers respectively compositions manufactured therefrom, and to the use of the polyether block copolymers and of the preparations.

Reaction products of polymers or oligomers containing hydroxyl groups—for example, with a stoichiometric excess of di- or polyisocyanates, which are then present as so-called polyurethane prepolymers having isocyanate terminal groups—are utilized in a number of sectors, for example as sealants, coating materials, or adhesives.

For many applications, such compositions are solvent-free and are highly viscous and/or pasty; they are processed at room temperature or at slightly elevated temperature between approximately 50° C. and 100° C.

If these compositions are solid at room temperature and are meltable when warm resp. hot with moisture excluded, they can be used as reactive melt adhesives. One-component reactive melt adhesives for purposes of this invention are therefore moisture-hardening resp. moisture-crosslinking adhesives that are solid at room temperature and are applied as an adhesive in the form of their melt. Examples that may be recited are polyurethane melt adhesives, the polymeric constituents of which contain urethane groups as well as reaction-capable isocyanate groups. Cooling of the melt by application onto the substrate, and further cooling of the melt by parts of the substrate, firstly causes rapid physical setting of the melt adhesive as a result of its solidification, followed by a chemical reaction between those reactive groups still present and moisture from the environment, to yield a crosslinked non-meltable adhesive. Reactive melt adhesives based on isocyanate-terminated polyurethane prepolymers are described, for example, by H. F. Huber and H. Müller in "Shaping Reactive Hotmelts Using LMW Copolyesters," Adhesives Age, November 1987, pp. 32-35.

Laminating adhesives either can be similar in structure to the reactive melt adhesives, or can be applied as one-component systems from solution in organic solvents; a further embodiment is made up of two-component polyurethane-based solvent-containing or solvent-free systems, in which the polymeric constituents of the one component contain urethane groups as well as reaction-capable isocyanate groups, and the second component contains polymers resp. oligomers having hydroxyl groups, amino groups, epoxy groups, and/or carboxyl groups. In these two-component systems, the isocyanate-group-containing component and the second component are mixed immediately before application, normally with the aid of a mixing and dispensing system.

Adhesives, sealants, or coating agents based on reactive polyurethane compositions are notable for a very high performance profile. It has therefore been possible in recent years to open up an increasing number of new applications for these adhesives, sealants, and coating agents. Compositions for such adhesives and/or sealants are already known from a very large number of patent applications and other publications.

WO 99/28363 A1 relates to melt adhesive compositions based on polyurethane prepolymers, which are solid at room temperature and are embodied to be moisture-crosslinking. The adhesive compositions contain, alongside a reaction product of the reaction of a first polyisocyanate with a low-molecular-weight polymer that encompasses ethylenically unsaturated monomers and comprises active hydrogen groups, at least one polyurethane prepolymer having free isocyanate groups from the production of at least one polyol from the group of polyether diols, polyether triols, polyester polyols, aromatic polyols, and mixtures thereof with at least one second polyisocyanate, as well as optionally various additives.

EP 0 205 846 A1 describes the manufacture of hydroxytelechelic polymers based on acrylates by polymerization in the presence of an initiator from the group of the peroxides, hydroperoxides, or azo compounds, capable of transferring hydroxyl groups to the polymer, or by the action of UV radiation, hydrogen peroxide being recited as preferred, and simultaneously in the presence of hydroxyl-group-containing regulators of the general formula HO-A-$S_x$—B—OH. According to the teaching of this document, the hydroxytelechelic polymers can be reacted with diisocyanates in such a way that prepolymers containing isocyanate terminal groups are produced. Preparations based on these NCO-containing prepolymers are, according to EP 0 205 846 A1, suitable as adhesives and sealants.

EP 0455 400 A2 describes a mixture of isocyanate-terminated polyurethane prepolymers and the use thereof as an adhesive. The first prepolymer is based on polyhexamethylene adipate, and the second on polytetramethylene ether glycol; the two prepolymers are said to be preferably at least partly incompatible. The adhesive is said to have good adhesion to a plurality of substrates, in particular to plastics.

WO 92/13017 A1 describes a mixture of isocyanate-terminated polyurethane prepolymers. The first prepolymer is a reaction product of a predominantly semicrystalline polyester and a polyisocyanate. The polyester is a reaction product of a diol having 2 to 10 methylene groups and a dicarboxylic acid having 2 to 10 methylene groups. Diols can be ethylene glycol, butanediol-1,4, pentanediol-1,5, hexanediol-1,6, octanediol-1,8, decanediol-1,10, cyclohexanediol-1,4, cyclohexanedimethanol-1,4, and mixtures thereof. Dicarboxylic acids can be succinic acid, glutaric acid, adipic acid, sebacic acid, azelaic acid, dodecandioic acid, and mixtures thereof. Polyesters of hexanediol-1,6 and adipic acid are preferred. The second prepolymer contains a reaction product of a polytetramethylene ether glycol and a polyisocyanate. The third prepolymer is based on a reaction product of an amorphous polyester and a polyisocyanate. The amorphous polyester contains aromatic structural units. Preferred diols are ethylene glycol, propylene glycol, butanediol, hexanediol, cyclohexanedimethanol, neopentyl glycol, and mixtures thereof. The dicarboxylic acids are selected from the group consisting of succinic acid, adipic acid, sebacic acid, isophthalic acid, orthophthalic acid, terephthalic acid, and mixtures thereof. The mixture can also contain a fourth prepolymer that is made up of a reaction product of a branched polyester of adipic acid, diethylene glycol, and trimethylolpropane with a polyisocyanate. The higher molecular weight is said to significantly increase tack and cohesion. The high viscosity is disadvantageous. The adhesive is said to adhere well to metals and to polymeric substances such as polystyrene or polymethyl methacrylate.

WO 2001/046330 A1 describes compositions containing reaction products of a polyisocyanate with a polyester-polyether copolymer, a method for the manufacture thereof, and the use thereof as reactive melt adhesives. It is proposed therein to manufacture these copolymers from carboxyl-terminated polyester modules and polyether polyols. Although these melt adhesives already meet many technical requirements for modern adhesives, in particular melt adhesives, they cannot be used in certain sectors.

WO 2004/013199 A1 describes segmented polyurethane melt adhesive compositions that contain a reaction product of a stoichiometric excess of a polyisocyanate with a hydroxyfunctional polyester-ether block copolymer based on aromatic dicarboxylic acids, a reaction product of a polyisocyanate with a polyester polyol, and/or optionally a reaction product of a polyisocyanate with a polyether polyol, as well as optionally non-reactive thermoplastic polymers. Incorporation of the first-named component increases the reactive proportion in the adhesive composition and results in improved heat resistance and hydrolysis resistance, while simultaneously lowering the melting point of the polyester-ether copolymer component. In addition, the compatibility of the components in the composition is said to be improved. Polyether block copolymers having a central block and at least two polyoxypropylene blocks linking thereto, and their effects on the compatibility of the components respectively on separation phenomena, are not addressed.

WO 91/15530 A1 also describes urethane hot melt adhesives that encompass polyisocyanate prepolymers made of polyols and polyisocyanates as well as polyester-polyether copolymers, the latter comprising cyclic constituents, and the alcohol component of the ester units being made up of short-chain alkylene residues or amorphous, long-chain polyether units. Incorporation of the polyester-polyether copolymers results in higher water vapor permeability for the hot melt adhesives and sealants formulated on this basis, which in addition to the capability for forming thicker adhesive films, yields a number of further advantages.

It is known that block copolyesters, such as those described in WO 2004/013199 A1 and WO 91/15530 A1 cannot readily be mixed, even at temperatures above their melting point, with isocyanate-terminated prepolymers. Phase separation and/or domain separation often occurs, which makes the processing of such compositions substantially more difficult.

A need therefore continues to exist for improved reactive polymers and compositions, in particular for polyurethanes, that are suitable for use as adhesives, sealants, or coatings, in particular as hot melt adhesives or sealants. The raw materials used should be easily and economically accessible.

An object of the present invention is therefore to furnish components for the manufacture of compositions on the basis of which adhesives, sealants, and/or coating substances can be formulated, said components being intended to exhibit good miscibility with other polymer components both upon combination prior to reaction and within the completed polymer respectively the completed composition, and thereby to minimize separation processes (phase separation and domain separation). The adhesives or sealants manufactured from the compositions are furthermore intended to have a broad adhesion spectrum to a plurality of substrates, and to exhibit the highest possible level of strength after curing.

The manner in which the object is achieved by the present invention may be gathered from the claims. It consists substantially in furnishing polyether block copolymers of the general structure B-(A-OH)$_n$, where n is greater than or equal to 2, and blocks A are made up of polyoxypropylene units and the central block B is made up of polyoxytetramethylene, polyoxyethylene, polybutadiene, polyisoprene, polyacrylate, polymethacrylate, polyamide, polyurethane, or polyester units.

In preferred embodiments, n is less than or equal to 10, in particular less than or equal to 6, and particularly preferably equal to 2 or 3.

"Block copolymers" are understood as polymers whose molecules are made up of linearly linked blocks. A "block" is regarded as a segment of a polymer molecule that encompasses multiple identical repeating units and comprises at least one constitutional or configurative feature that differs from those of the adjacent segments (blocks). The term "polymer," respectively compounds characterized by the prefix "poly," are understood as compounds that comprise more than ten identical repeating units.

The polyether block copolymer according to the present invention is made up of at least two polyoxypropylene blocks A and a central polymer block B. Polymer block B involves polyoxytetramethylene, polyoxyethylene, polybutadiene, polyisoprene, polyacrylate, polymethacrylate, polyamide, polyurethane, or polyester units. The central polymer block B is preferably made up of polyoxytetramethylene, polyoxyethylene, polyacrylate, polymethacrylate, or polyurethane units, and particularly preferably of polyoxytetramethylene (poly-THF) or polyoxyethylene units. A polyoxypropylene block copolymer of this kind can be manufactured, for example, from an at least bifunctional polymer compound B having at least two terminal hydroxyl groups, onto which the polyoxypropylene block A is polymerized.

Hydroxyfunctional polyoxytetramethylene, polyoxyethylene, polybutadiene, polyisoprene, polyacrylate, polymethacrylate, polyamide, polyurethane, or polyester units are particularly suitable as a starting compound B. Particularly preferably, the at least bifunctional polymer compound B is made up of hydroxyfunctional polyoxytetramethylene, polyoxyethylene, polyacrylate, polymethacrylate, or polyurethane units, and very particularly preferably of hydroxyfunctional polyoxytetramethylene or polyoxyethylene units.

Hydroxyfunctional polyoxytetramethylenes (also called polytetrahydrofurans or "poly-THF") are obtainable commercially from a large number of manufacturers in suitable molecular-weight ranges from approx. 800 to 6000, a molecular weight from 800 to 5000 being preferred according to the present invention. The corresponding hydroxyfunctional polyoxyethylenes (polyethylene oxides), polyesters, polybutadienes, or polyisoprenes are likewise commercially obtainable. Of the polyester polyols, the liquid, glass-like amorphous, or crystalline polyesters are particularly suitable; these can be manufactured by condensing di-resp. tricarboxylic acids such as, for example, adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acid, or mixtures thereof, with low-molecular-weight diols resp. triols such as, for example, ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, or mixtures thereof.

A further group of polyester polyols usable according to the present invention is the polyesters based on ε-caprolactone, also called "polycaprolactones."

Polyester polyols of oleochemical derivation can, however, also be used. Such polyols can be manufactured, for example, by complete ring opening of epoxidized triglycerides of an at least partly olefinically unsaturated fatty-acid-containing fat mixture using one or more alcohols having 1 to 12 carbon atoms, and subsequent partial transesterification of the triglyceride derivatives to yield alkyl ester polyols having 1 to 12 carbon atoms in the alkyl residue. Further suitable polyols are polycarbonate polyols and dimer diols (Henkel company), as well as castor oil and derivatives thereof. The hydroxyfunctional polybutadienes, such as those obtainable e.g. under the trade name "Poly-bd," can likewise be used as polyols for the compositions according to the present invention, as can the hydrogenated analogs thereof.

Polyacrylates or polymethacrylates can be manufactured in accordance with commonly known methods. Particularly suitable according to the present invention are linear or weakly crosslinked acrylic ester copolymer polyols, which can be manufactured e.g. by radical copolymerization of acrylic acid esters resp. methacrylic acid esters with hydroxy-functional compounds of acrylic acid and/or methacrylic acid, such as hydroxyethyl(meth)acrylate or hydroxypropyl (meth)acrylate. Because of this method of manufacture, the hydroxyl groups in these polyols are as a rule statistically distributed, so that these polyols are either linear or weakly crosslinked and have an average OH functionality.

The corresponding polyamide derivatives can be manufactured by condensation (known per se) of di- or polycarboxylic acids and diamines with concurrent use of hydroxycarboxylic acids. Hydroxyfunctional polyurethanes can be produced in known fashion from di- or polyisocyanates with a stoichiometric excess of one or more polyols.

The starter polyol B by preference has an average molecular weight from 500 to 10,000 g/mol (dalton); the average molecular weight range of the starter block B is by preference between 1000 and 4000 dalton. The central block B is preferably propoxylated by DMC catalysis, catalysis by means of one or more phosphacene and/or porphyrin derivative(s), or alkali metal catalysis, in particular Cs catalysis, preferably by DMC catalysis.

Particularly advantageous viscoelastic properties in the polyether block copolymers to be manufactured are achieved when both the central block B and the polyoxypropylene polymer blocks A polymerized onto the starter polyol B possess a narrow molar mass distribution and thus a low polydispersity. This can be achieved, for example, by the fact that a so-called double metal cyanide (DMC) catalyst is used as an alkoxylation catalyst. Examples of such DMC catalysts are zinc hexacyanocobaltate(II), zinc hexacyanoferrate(II), zinc hexacyanoferrate(III), nickel(II) hexacyanoferrate, and cobalt(II) hexacyanocobaltate(III). These DMC catalysts are described in the literature.

DMC catalysts that are very particularly suitable for polymerizing on the polyoxypropylene blocks A in according to the present invention are those having the general formula

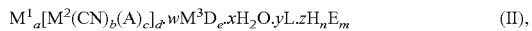

$$M^1{}_a[M^2(CN)_b(A)_c]_d \cdot wM^3D_e \cdot xH_2O \cdot yL \cdot zH_nE_m \quad (II),$$

in which $M^1$ denotes at least one divalent metal atom selected from Zn(II), Fe(II), Co(II), Ni(II), Mn(II), Cu(II), Sn(II), or Pb(II), and $M^2$ is at least one of the di-, tri-, tetra-, or pentavalent metals Fe(II), Fe(III), Co(III), Cr(III), Mn(II), Mn(III), Ir(III), Rh(III), Ru(II), V(IV), or V(V). $M^3$ in this context can be $M^1$ and/or $M^2$, and A, D, and E each signify an anion, which can be the same or different. L is a solvent ligand selected from an alcohol, aldehyde, ketone, ether, ester, amide, nitrile, or sulfide or a mixture thereof; a and d are numbers that correspond to the valence of $M^1$ and $M^2$ in the double metal cyanide portion of general formula (II); b and c signify whole numbers (where b>c) that, together with a and d, produce the electroneutrality of the double metal cyanide portion of general formula (II); e is a whole number that corresponds to the valence of $M^3$; n and m are whole numbers that produce the electroneutrality of HE; w is a number between 0.1 and 4; x is a number up to 20; y is a number between 0.1 and 6; and z is a number between 0.1 and 5.

Also suitable for adding on the polyoxypropylene polymer blocks A by polymerization according to the present invention are the DMC catalyst complexes made up of a double metal cyanide of the kind recited above, an organic coordination agent, a soluble metal salt, a polyether polyol, and an organic polysiloxane.

In addition to the particularly narrow molecular weight distribution achievable with DMC catalysts, the polyether block copolymers manufactured in this fashion are also notable for a high achievable average molecular weight and a very low number of double bonds at the ends of the polymer chains. The polyoxypropylene units blocks A and the central block B typically have a polydispersity PD ($M_w/M_n$) of less than 2.5, by preference from 1.0 to 2.0, and particularly preferably from 1.1 to 1.5.

The polyether block copolymers according to the present invention of the structure B-(A-OH)$_n$ preferably have molecular weights ($M_n$) of between 4000 and 40,000 g/mol (dalton), and an OH number according to DIN 53783 of between 3 and 56 mg KOH/g, preferably between 6 and 20 mg KOH/g.

Also a subject of the present invention is a composition that is obtainable by reacting at least one polyether block copolymer according to the present invention of the general structure B-(A-OH)$_n$ and at least one component that contains at least one polymer sequence that, in material terms, matches structure A or B of the polyether block copolymer according to the present invention. Phase separation and domain separation processes can be suppressed with a composition of this kind.

"Matches in material terms" is understood to mean, according to the present invention, that the relevant polymer sequences are made up of the same monomers, which are also identically linked to one another. The relevant polymer sequences are therefore to be addressed using identical compound names. The term "matches in material terms" does not, however, embrace parameters that result from the number of monomers, in particular the molar mass. The second component can thus, within the scope of the method according to the present invention, contain polyoxypropylene and/or one of the polymers listed above that form the central polymer block B within the polyether block copolymer according to the present invention of the general structure B-(A-OH)$_n$, in which context the polymer sequences can certainly exhibit different molecular weights.

A composition that is obtainable by reacting at least one polyether block copolymer according to the present invention of the general structure B-(A-OH)$_n$, at least one component that contains at least one polymer sequence that matches, in material terms, structure A or B of the polyether block copolymer according to the present invention, as well as at least one polyisocyanate present at a stoichiometric excess based on the molar NCO/OH ratio of the sum of all components, is preferred according to the present invention.

A composition that is obtainable by reacting a) at least one polyether block copolymer according to the present invention, b) at least one hydroxyfunctional block copolyester that is manufactured from at least one polycarboxylic acid, at least one short-chain diol, and at least one polyol, the polyol containing at least one polymer sequence that, in material terms, matches structure A or B of the polyether block copolymer according to the present invention, and c) at least one polyisocyanate, used at a stoichiometric excess based on the molar NCO/OH ratio of the sum of all components, is particularly preferred. A composition of this kind is particularly well suited, for example, as a basis for hot melt adhesives and/or coating substances.

"Hydroxyfunctional" is understood to mean that the relevant component possesses at least two reactive OH groups.

The totality of the components to be reacted preferably has a terminal unsaturation that is less than 0.07 meq/g, in particular less than 0.04 meq/g and preferably is 0.02 meq/g, determined using the ASTM D4671 method.

Suitable polyisocyanates in this context are in particular diisocyanates that are selected from the group consisting of all isomers of toluylene diisocyanate (TDI), either in pure-isomer form or as a mixture of multiple isomers, naphthalene-1,5-diisocyanate, 4,4'-diphenylmethane diisocyanate, 2,4'-diphenylmethane diisocyanate, and mixtures thereof, xylylene diisocyanate (XDI), 4,4'-dicyclohexylmethane diisocyanate ($H_{12}$MDI), 1-isocyanatomethyl-3-isocyanato-1,5,5-trimethyl diisocyanate (isophorone diisocyanate, IPDI), cyclohexane-1,4-diisocyanate, hydrogenated xylylene diisocyanate ($H_6$XDI), 1-methyl-2,4-diisocyanatocyclohexane, hexane-1,6-diisocyanate (HDI), m- or p-tetramethylxylene diisocyanate (m-TMXDI, p-TMXDI), or mixtures of the aforesaid diisocyanates. The poly-respectively diisocyanate is used by preference at a stoichiometric excess of 1.05 to 6:1 (mol/mol ratio of the NCO/OH groups).

After complete reaction, the excess monomeric polyisocyanate is preferably removed from the reaction mixture using distillation, extraction, chromatographic, or crystallization methods. Particularly preferably, removal of the residual monomer or the monomer mixture is accomplished by thin layer distillation, short path distillation, optionally under high vacuum, or by passing inert gas through in countercurrent, residual monomer contents of less 0.1 wt % being obtained. A combination of two or more of the separation methods recited above can also be utilized.

Polycarboxylic acids for manufacturing the block copolyester are preferably aromatic dicarboxylic acids selected from terephthalic acid, isophthalic acid, phthalic acid, dibenzoic acid, bis(p-carboxyphenyl)methane, p-oxy(p-carboxyphenyl)benzoic acid, ethylene-bis(p-oxybenzoic acid), ethylene-bis-(p-benzoic acid), tetramethylene-bis(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, indenedicarboxylic acid, as well as nucleosubstituted derivatives thereof such as $C_1$ to $C_{10}$ alkyl, halogen, alkoxy, or aryl derivatives, p-(β-hydroxyethyoxy) benzoic acid, or mixtures thereof, the proportion of terephthalic acid preferably accounting for at least 75 wt % of the dicarboxylic acid mixture. Portions of aliphatic or cycloaliphatic dicarboxylic acids can optionally also be used to manufacture the polyester ether block copolymer.

$C_2$ to $C_{12}$ alkanediols, by preference ethylene glycol, propylene glycol, butanediol, hexanediol, octanediol, or mixtures thereof, are preferably used as short-chain diol components of the block copolyester.

The at least one polyol that is used to construct the block copolyester and contains at least one polymer sequence matching, in material terms, the sequence A or B of the polyether block copolymer according to the present invention is preferably a polyoxypropylene polyol or a polymer corresponding to the polymers described above as "starting compound B," although it need not match it in terms of molecular weight. It is likewise possible according to the present invention, however, for the polyol to contain only one polymeric sequence, which is also encountered again in a "starting compound B." A sequence of this kind can be present, for example, within a block copolymer structure, in which context further blocks can certainly differ, both in terms of material and with regard to their molecular weights, from the constituents of the polyether block copolymer B-(A-OH)$_n$ according to the present invention. The phrase "in terms of material" encompasses, in the sense already mentioned, the chemical nature of the monomers and their linkage, but not their number and thus molecular weight.

A composition that is obtainable by reacting a) at least one polyether block copolymer according to the present invention, b) at least one hydroxyfunctional block copolyester that is manufactured from at least one polycarboxylic acid, at least one short-chain diol, and at least one polyol, the polyol containing at least one polymer sequence that, in material terms, matches structure A or B of the polyether block copolymer according to the present invention, c) at least one hydroxyfunctional polyester that is manufactured from a polycarboxylic acid and a short-chain diol, and d) at least one polyisocyanate, used at a stoichiometric excess based on the molar NCO/OH ratio of the sum of all components, is very particularly preferred. For preferred components of the polyester manufactured from polycarboxylic acid and short-chain diol, the relevant statements regarding the block copolyester apply.

In the compositions according to the present invention, the central block B of the polyether block copolymer a) according to the present invention is preferably made up of polyoxytetramethylene, polyoxyethylene, polyacrylate, polymethacrylate, or polyurethane units. Particularly preferably, the central block B of the polyether block copolymer a) according to the present invention is made up of polyoxytetramethylene (poly-THF) or polyoxyethylene units. The result is to produce a composition according to the present invention that comprises polyoxyalkylene units as matching structural elements. Such units advantageously improve the flexibility of the adhesive bonds or coatings produced therewith. In addition, the polyoxyalkylene units of the central block B and the polyoxypropylene units of blocks A of the polyether block copolymer create a broader basis for the use of different block copolyesters, since polyoxyalkylene structures are often used in the construction of block copolyesters. Multiple capabilities are thereby obtained for creating structures that match in material terms.

The compositions according to the present invention are particularly well suited as a reactive melt adhesive and/or coating substance, and exhibit no phase separation or domain separation either during manufacture or within the finished composition.

A further subject of the present invention is a method for manufacturing a composition, which method is characterized in that at least one polyether block copolymer according to the present invention of the general structure B-(A-OH)$_n$, and at least one component that contains at least one polymer sequence that matches, in material terms, structure A or B of the polyether block copolymer according to the present invention, are reacted with one another.

In the context of a preferred embodiment of the method according to the present invention, at least one polyether block copolymer according to the present invention of the general structure B-(A-OH)$_n$, at least one component that contains at least one polymer sequence that matches, in material terms, structure A or B of the polyether block copolymer according to the present invention, and at least one polyisocyanate present at a stoichiometric excess based on the molar NCO/OH ratio of the sum of all components, are reacted with one another.

In particular, at least a) one polyether block copolymer according to the present invention, b) at least one hydroxyfunctional block copolyester that is manufactured from at least one polycarboxylic acid, at least one short-chain diol, and at least one polyol, the polyol containing at least one polymer sequence that, in material terms, matches structure A or B of the polyether block copolymer according to the present invention, and c) at least one polyisocyanate, used at a stoichiometric excess based on the molar NCO/OH ratio of the sum of all components, are reacted with one another.

Compositions manufactured according to this method are particularly well suited as a basis for hot melt adhesives and/or coating substances.

It is particularly preferred in the context of the method according to the present invention to manufacture a composition by reacting a) at least one polyether block copolymer according to the present invention, b) at least one hydroxyfunctional block copolyester that is manufactured from at least one polycarboxylic acid, at least one short-chain diol, and at least one polyol, the polyol containing at least one polymer sequence that, in material terms, matches structure A or B of the polyether block copolymer according to the present invention, c) at least one hydroxyfunctional polyester that is manufactured from a polycarboxylic acid and a short-chain diol, and d) at least one polyisocyanate, used at a stoichiometric excess based on the molar NCO/OH ratio of the sum of all components. For preferred components of the polyester manufactured from polycarboxylic acid and short-chain diol, the relevant statements regarding the block copolyester apply.

Alternatively to the methods hitherto described, respectively to the compositions that are obtainable by means of said methods, it is possible according to the present invention to react the polyether block copolymers according to the present invention of the general structure $B\text{-}(A\text{-}OH)_n$ in a first step with a stoichiometric excess, based on the molar ratio of NCO groups to OH groups, of at least one poly- or diisocyanate. The product resulting therefrom is then further reacted, in accordance with the embodiments above, with at least one component that contains at least one polymer sequence that matches, in material terms, structure A or B of the polyether block copolymer according to the present invention, optionally with a further di- or polyisocyanate and optionally with further components, to yield a composition according to the present invention.

A further subject of the present invention is a preparation that contains at least one composition according to the present invention or a composition manufactured in accordance with a method according to the present invention.

The preparations according to the present invention can also contain, in addition to a composition according to the present invention, further adjuvants and additives that impart to these preparations improved elastic properties, improved elastic recovery, a sufficiently long processing time, a fast curing time, and low residual tack. Included among these adjuvants and additives are, for example, plasticizers, stabilizers, antioxidants, fillers, reactive diluents, drying agents, adhesion promoters and UV stabilizers, rheological adjuvants, color pigments or color pastes, and/or optionally also, to a small extent, solvents.

Suitable as plasticizers are, for example, adipic acid esters, azelaic acid esters, benzoic acid esters, butyric acid esters, acetic acid esters, esters of higher fatty acids having approximately 8 to approximately 44 carbon atoms, esters of OH— group-carrying or epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters (e.g. "Mesamoll," alkylsulfonic acid phenyl ester, Bayer company), thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Düsseldorf), or also esters of abietic acid, are particularly suitable.

Suitable among the phthalic acid esters are, for example, dioctyl phthalate (DOP), dibutyl phthalate, diisoundecyl phthalate (DIUP), or butylbenzyl phthalate (BBP) or their derived hydrogenated derivatives; and among the adipates, dioctyl adipate (DOA), diisodecyl adipate, diisodecyl succinate, dibutyl sebacate, or butyl oleate.

Also suitable as plasticizers are the pure or mixed ethers of monofunctional, linear, or branched $C_{4-16}$ alcohols or mixtures of two or more different ethers of such alcohols, for example dioctyl ether (obtainable as Cetiol OE, Cognis Deutschland GmbH, Düsseldorf).

Also suitable as plasticizers are end-capped polyethylene glycols, for example $C_{1-4}$-alkyl ethers of polyethylene glycol or of polypropylene glycol, in particular the dimethyl or diethyl ethers of diethylene glycol and dipropylene glycol, as well as mixtures of two or more thereof.

For further details regarding plasticizers, reference is made to the relevant literature regarding industrial chemistry.

Plasticizers can be additionally used in the preparation at between 0 and 40, by preference between 0 and 20 wt % (based on the total composition).

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles, for example Tinuvin 327 (Ciba Specialty Chemicals), and/or amines of the hindered amine light stabilizer (HALS) type, for example Tinuvin 770 (Ciba Specialty Chemicals). It is preferred in the context of the present invention if a UV stabilizer that carries a silyl group, and that is incorporated into the end product upon crosslinking resp. curing, is used. The products Lowilite 75, Lowilite 77 (Great Lakes company, USA) are particularly suitable for this purpose. Benzotriazoles, benzophenones, benzoates, cyanoacrylates, acrylates, sterically hindered phenols, phosphorus, and/or sulfur can also be added. The preparation according to the present invention can contain up to approximately 2 wt %, by preference approx. 1 wt % stabilizers. In addition, the preparation according to the present invention can further contain up to approximately 7 wt %, in particular up to approx. 5 wt % antioxidants.

The catalysts that can be used are all known compounds that, for example, can catalyze the hydrolysis of NCO groups and subsequent condensation of the resulting amino group with NCO groups that are still present (crosslinking reaction). Examples thereof are titanates such as tetrabutyl titanate and tetrapropyl titanate, tin carboxylates such as dibutyltin dilaulate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaulate, dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, 2-ethyl-4-methylimidazole, and 1,8-diazabicyclo-(5,4,0)-undecene-7 (DBU), or derivatives of morpholine. Concrete examples of suitable morpholino-compounds are N-methylmorpholine, bis(2-(2,6-dimethyl-4-morpholino)ethyl)-(2-(4-morpholino)ethyl)amine, bis(2-(2,6-dimethyl-4-morpholino)ethyl)-(2-(2,6-diethyl-4-morpholino)ethyl)amine, tris(2-(4-morpholino)ethyl)amine, tris(2-(4-morpholino)propyl)amine, tris(2-(4-morpholino)butyl)amine, tris(2-(2,6-dimethyl-4-morpholino)ethyl)amine, tris(2-(2,6-diethyl-4-morpholino)ethyl)amine, tris(2-(2-methyl-4-morpholino)ethyl)amine or tris(2-(2-ethyl-4-morpholino)ethyl)amine, dimethylaminopropylmorpholine, bis-(morpholinopropyl)methylamine, diethylaminopropylmorpholine, bis-(morpholinopropyl)ethylamine, bis-(morpholinopropyl)propylamine, morpholinopropylpyrrolidone or N-morpholinopropyl-N'-methylpiperazine, dimorpholinodiethyl ether (DMDEE) or di-2,6-dimethylmorpholinoethyl) ether. The catalyst, preferably mixtures of several catalysts, is used in a quantity preferably from 0.01 to approximately 5 wt % based on the total weight of the preparation.

The preparation according to the present invention can additionally contain fillers. Suitable in this context are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, wood chips, chopped straw, chaff, ground walnut shells, and other chopped fibers. Short fibers such as glass fibers, glass filament, polyacrylonitrile, carbon fibers, Kevlar fibers, or also polyethylene fibers can also be added. Aluminum powder is likewise suitable as a filler.

The pyrogenic and/or precipitated silicic acids advantageously have a BET surface area from 10 to 90 m$^2$/g. When they are used, they produce no additional increase in the viscosity of the preparation according to the present invention, but do contribute to strengthening the hardened preparation.

It is likewise conceivable to use pyrogenic and/or precipitated silicic acids having a higher BET surface area, advantageously 100 to 250 m$^2$/g, in particular 110 to 170 m$^2$/g, as a filler. Because of the greater BET surface area, the same effect (e.g. strengthening of the hardened preparation) can be achieved with a smaller weight proportion of silicic acid. It is thus possible to use further substances in order to improve the preparation according to the present invention in terms of other requirements.

Further suitable as fillers are hollow spheres having a mineral shell or a plastic shell. These can be, for example, hollow glass spheres that are obtainable commercially under the trade names Glass Bubbles®. Plastic-based hollow spheres, e.g. Expancel® or Dualite®, are described e.g. in EP 0 520 426 B1. They are made up of inorganic or organic substances and each have a diameter of 1 mm or less, preferably 500 µm or less.

Fillers that impart thixotropy to the preparations are preferred for many applications. Such fillers are also described as rheological adjuvants, e.g. hydrogenated castor oil, fatty acid amides, or swellable plastics such as PVC. In order to be readily squeezable out of a suitable dispensing apparatus (e.g. a tube), such compositions possess a viscosity from 3000 to 15,000, preferably 40,000 to 80,000 mPas, or also 50,000 to 60,000 mPas.

The fillers are used by preference in a quantity from 0 to 80 wt %, by preference from 5 to 60 wt %, based on the total weight of the preparation.

Examples of suitable pigments are titanium dioxide, iron oxides, or carbon black.

It is often useful to further stabilize the preparations according to the present invention with respect to the penetration of moisture using drying agents, in order to increase shelf life even further.

Suitable adhesion promoters are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight above 700, in finely ground form, are then preferably used for this. Organofunctional silanes are likewise suitable as adhesion promoters; mention may be made here, by way of example, of the aminoalkylalkoxysilanes, 3-glycidyloxypropyltrialkoxysilane, 3-mercaptopropyltrialkoxysilane, 3-aminopropyltrialkoxysilane, N-aminoethyl-3-aminopropylmethyldialkoxysilane, phenylaminopropyltrialkoxysilane, aminoalkyltrialkoxydisilane, or isobutylmethoxysilane, or also vinyltrialkoxysilan. The alkoxy groups here are, as a rule, C1 to C4 alkoxy groups. If tackifying agents are used as adhesion promoters, the nature and quantity thereof depends on the adhesive/sealant composition and on the substrate onto which the latter is applied. Typical tackifying resins (tackifiers), such as e.g. terpene-phenolic resins or resin acid derivatives, are used in concentrations between 5 and 20 wt %; typical adhesion promoters such as polyamines, polyaminoamides, organofunctional silanes, or phenolic resins or resorcinol derivatives are used in the range between 0.1 and 10 wt %, based on the total composition of the preparation.

Hot melt preparations, in particular, based on compositions according to the present invention can contain non-reactive thermoplastic polymers. Non-reactive thermoplastic polymers that can be used are thermoplastic polyurethanes, thermoplastic polyester block copolymers, thermoplastic polyether amides, or low-molecular-weight polymers of ethylenically unsaturated monomers. Concrete examples thereof are (co)polymers of one or more of the following monomers: $C_1$ to $C_{18}$ alkyl esters of acrylic acid or of methacrylic acid, acrylic acid, methacrylic acid, ethylene, vinyl acetate, vinyl propionate, vinyl versatate, vinyl ethers, alkyl fumarates, alkyl maleates, styrene, alkylstyrene, acrylonitrile and/or butadiene or isoprene, as well as hydrogenation products of the last-named diene copolymers, such as e.g. styrene-ethylene-propylene or styrene-ethylene-butylene di- or tri-block copolymers. These thermoplastics usually have a relatively low molecular weight. A "low molecular weight" means in this connection an average molecular weight below 60,000; the molecular weight of such thermoplastic polymers is by preference between 10,000 and 40,000. All thermoplastics that contain practically no Zerewitinoff-active hydrogen are "non-reactive" for purposes of this invention.

Preparations according to the present invention that are suitable as a melt adhesive can furthermore contain tackifying resins such as, for example, abietic acid, abietic acid esters, terpene resins, terpene-phenolic resins, poly-α-methylstyrene, or aliphatic, aromatic, or aromatic/aliphatic hydrocarbon resins or coumarone/indene resins. These tackifying resins can optionally contain active hydrogen atoms, so that they can be incorporated into the binding-agent matrix of the melt adhesive by reaction with optionally present di- or polyisocyanates. Concrete examples thereof are hydroxyfunctional esters of abietic acid or also hydroxylated terpene-phenolic resins. Further typical constituents of melt adhesive compositions are fillers (e.g. silicates, talc, calcium carbonates, clays, or carbon black), thixotropy agents (e.g. Bentone, pyrogenic silicic acids, urea derivatives, fibrillated or pulp short fibers), color pastes resp. pigments, or conductivity additives such as conductive carbon blacks or lithium perchlorate.

Manufacture of the preparation according to the present invention is accomplished preferably in accordance with known methods, by intimate mixing of the constituents in suitable dispersing equipment, e.g. high-speed mixers, kneaders, planetary mixers, planetary dissolvers, internal mixers, so-called "Banbury" mixers, double-screw extruders, and similar mixing equipment known to one skilled in the art.

A preferred embodiment of the preparation according to the present invention contains:
  5 to 60 wt %, by preference 10 to 50 wt %, particularly preferably 20 to 45 wt % of a composition according to the present invention,
  0 to 30 wt %, by preference 5 to 15 wt % of a non-reactive thermoplastic polymer,
  0 to 60 wt %, by preference 20 to 50 wt % of a tackifying resin, and
  optionally, further adjuvants and additives selected from the group of the fillers, thixotropy agents, color pigments, conductivity additives, stabilizers, and aging protection agents, as well as adhesion-promoting additives,
the sum of all the preparation constituents being equal to 100 wt %.

The compositions according to the present invention respectively manufactured according to the present invention preferably contain prepolymers respectively represent prepolymers that cure with ambient atmospheric moisture to yield polymers, so that moisture-hardening adhesive and/or sealant preparations or coating agents can be manufactured from these prepolymers with the aforementioned adjuvants and additives.

A further subject of the present patent application is the use of a preparation according to the present invention as a reactive melt adhesive, in particular for assembly bonding, areal bonding, and/or coating. The preparations according to the present invention are furthermore suitable for use as a one- or two-component solvent-free or solvent-containing laminating adhesive for assembly bonding, areal bonding, and/or coating of paper, plastic films, metal foils, textiles, nonwovens, or other web-shaped materials, in which context the latter can optionally be imprinted and/or painted.

In principle, all features set forth in the context of the present text, in particular the embodiments, proportion ranges, constituents, and other features of the subjects of the invention identified as preferred and/or special, can be implemented in the present invention in all possible combinations that are not mutually exclusive, combinations of features identified as preferred and/or special likewise being regarded as preferred and/or special.

The invention is intended to be further explained in the exemplifying embodiments that follow; the selection of the Examples is not intended to represent any limitation of the scope of the subject matter of the invention.

EXAMPLES

The DMC catalyst is manufactured as specified by Shell, as described in U.S. Pat. No. 4,477,589, Example 6, accelerated variant.

Polyether Block Copolymer 1 (According to the Present Invention): Manufacture of PPG-pTHF2000-PPG Block Copolymer, m/w 4000

250 g poly-THF ($M_n$ 2000) was made ready in a 2-liter reactor, and heated overnight. The mixture then had 200 ppm DMC catalyst added to it, was purged three times, and 250 g propylene oxide was added at 110° C. over four hours. Stirring continued for one hour after addition, and the mixture was decanted with 300 ppm radical scavenger (e.g. Irganox 1010) for stabilization. The polyether block copolymer 1 has an OH number of 28 in a melting range of 45° C.

Polyether Block Copolymer 2 (According to the Present Invention): Manufacture of PPG-pTHF2000-PPG Block Copolymer, m/w 8000

83 g poly-THF ($M_n$ 2000) was made ready in a 2-liter reactor, and heated overnight. The mixture then had 200 ppm DMC catalyst added to it, was purged three times, and 470 g propylene oxide was added at 110° C. over four hours. Stirring continued for one hour after addition, and the mixture was decanted with 300 ppm radical scavenger for stabilization.

The polyether block copolymer 2 has an OH number of 14 at a viscosity of 12,800 mPas at room temperature.
Polyurethane Hot Melts A hot melt adhesive is formulated on the basis of the following basic composition (indications in percent by weight):
40% α-methylstyrene resin
10% block copolyester (according to Table 1)
10% ethyl vinyl acetate (50% VAc)
15% polyol (according to Table 1)
15% hydroxyl-group-containing aliphatic polyester (Dynacoll 7360)
10% 4,4'-methylenebis(phenylisocyanate) (MDI)

TABLE 1

Block copolyesters and polyols in the above basic composition: effect on compatibility of components

| Example no. | 1 (comparison) | 2 (invention) | 3 (comparison) | 4 (invention) |
|---|---|---|---|---|
| Block copolyester | Hytrel 3078 | Hytrel 3078 | Hytrel G 3548 | Hytrel G 3548 |
| Polyol | PPG | Polyether block copolymer 1 | p-THF | Polyether block copolymer 2 |
| Separation | yes | no | yes | no |

Hytrel 3078: Block copolyester of phthalic acid/p-THF/butanediol, DuPont
Hytrel G 3548: Block copolyester of terephthalic acid/PPG/butanediol, DuPont
PPG: Polypropylene glycol
p-THF: Polytetrahydrofuran The following is apparent from Table 1: When a polyol that does not comprise a polymer sequence contained in the block copolyester is used, separation phenomena occur. This means here that the block copolyester initially dissolves very little in the mixture of the further components, even above its melting point, but at the latest precipitates again below its melting temperature (phase separation). Separate phases respectively domains are also present in the finished hot melt adhesive. When a polyether block copolymer according to the present invention is used, on the other hand, the components dissolve very easily in one another. No separation therefore occurs, either before and during reaction or in the finished adhesive.

The invention claimed is:

1. A polyether block copolymer of the general structure B-(A-OH)$_n$, where n is greater than or equal to 2 and blocks A are made up of polyoxypropylene units and the central block B of polyoxytetramethylene, polybutadiene, polyisoprene, polyacrylate, polymethacrylate, polyamide, polyurethane, or polyester units and wherein the polyoxypropylene units A and the central block B each have a polydispersity PD ($M_w/M_n$) of less than 2.5.

2. The polyether block copolymer according to claim 1, wherein the polyether block copolymer has a molecular weight of between 4,000 and 40,000 g/mol (dalton).

3. The polyether block copolymer according to claim 1, wherein the central block B has been propoxylated by DMC catalysis, catalysis by means of one or more phosphacene and/or porphyrin derivative(s), or Cs catalysis.

4. A composition obtained by reacting at least one polyether block copolymer according to claim 1 and at least one component containing at least one polymer sequence that, in material terms, matches structure A or B of the polyether block copolymer according to claim 1.

5. The composition according to claim 4, obtainable by reacting at least one polyether block copolymer according to claim 1, at least one hydroxyfunctional block copolyester manufactured from at least one polycarboxylic acid, at least one short-chain diol, and at least one polyol, the polyol containing at least one polymer sequence that, in material terms, matches structure A or B of the polyether block copolymer according to claim 1, and at least one di- or polyisocyanate, used at a stoichiometric excess based on the molar NCO/OH ratio of the sum of all components.

6. The composition according to claim 4, wherein the totality of the components to be reacted has a terminal unsaturation that is less than 0.07 meq/g, determined using the ASTM D4671 method.

7. A preparation containing at least one composition according to claim 4.

8. A reactive hot melt adhesive comprising the composition according to claim 4.

9. The polyether block copolymer according to claim 1, wherein central block B is made up of polybutadiene, polyisoprene, polyacrylate, polymethacrylate, polyamide, polyurethane, or polyester units.

10. The polyether block copolymer according to claim 1, wherein central block B is made up of polybutadiene, polyisoprene, polyacrylate, polyamide, or polyurethane units.

11. The polyether block copolymer according to claim 1, wherein the central block B has been propoxylated by DMC catalysis.

* * * * *